Dec. 24, 1940.  W. B. STONE  2,225,806
BRAKE SHOE LINING GRINDING MACHINE
Filed Aug. 31, 1939   2 Sheets-Sheet 1
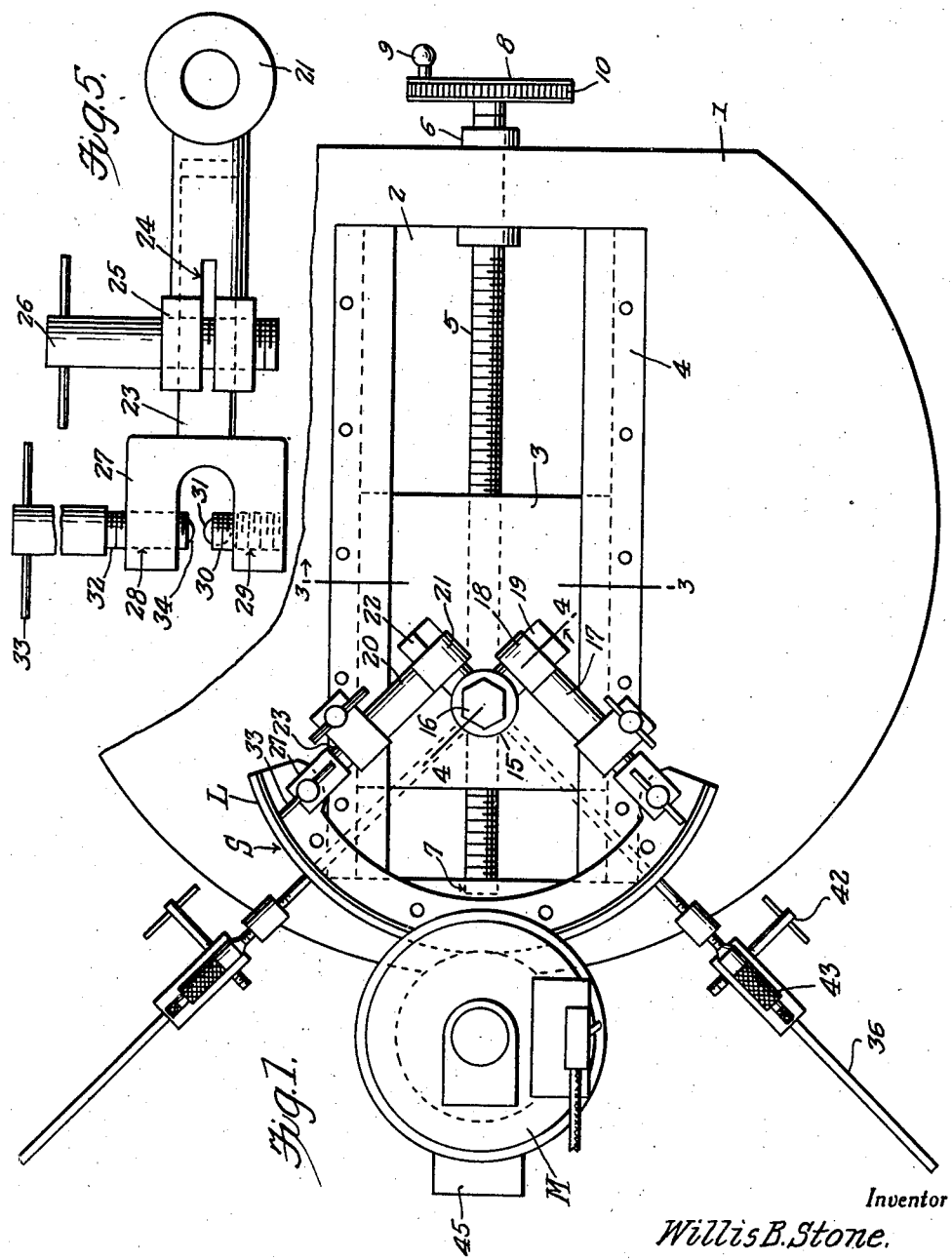
Inventor
*Willis B. Stone.*

Dec. 24, 1940.  W. B. STONE  2,225,806
BRAKE SHOE LINING GRINDING MACHINE
Filed Aug. 31, 1939  2 Sheets-Sheet 2
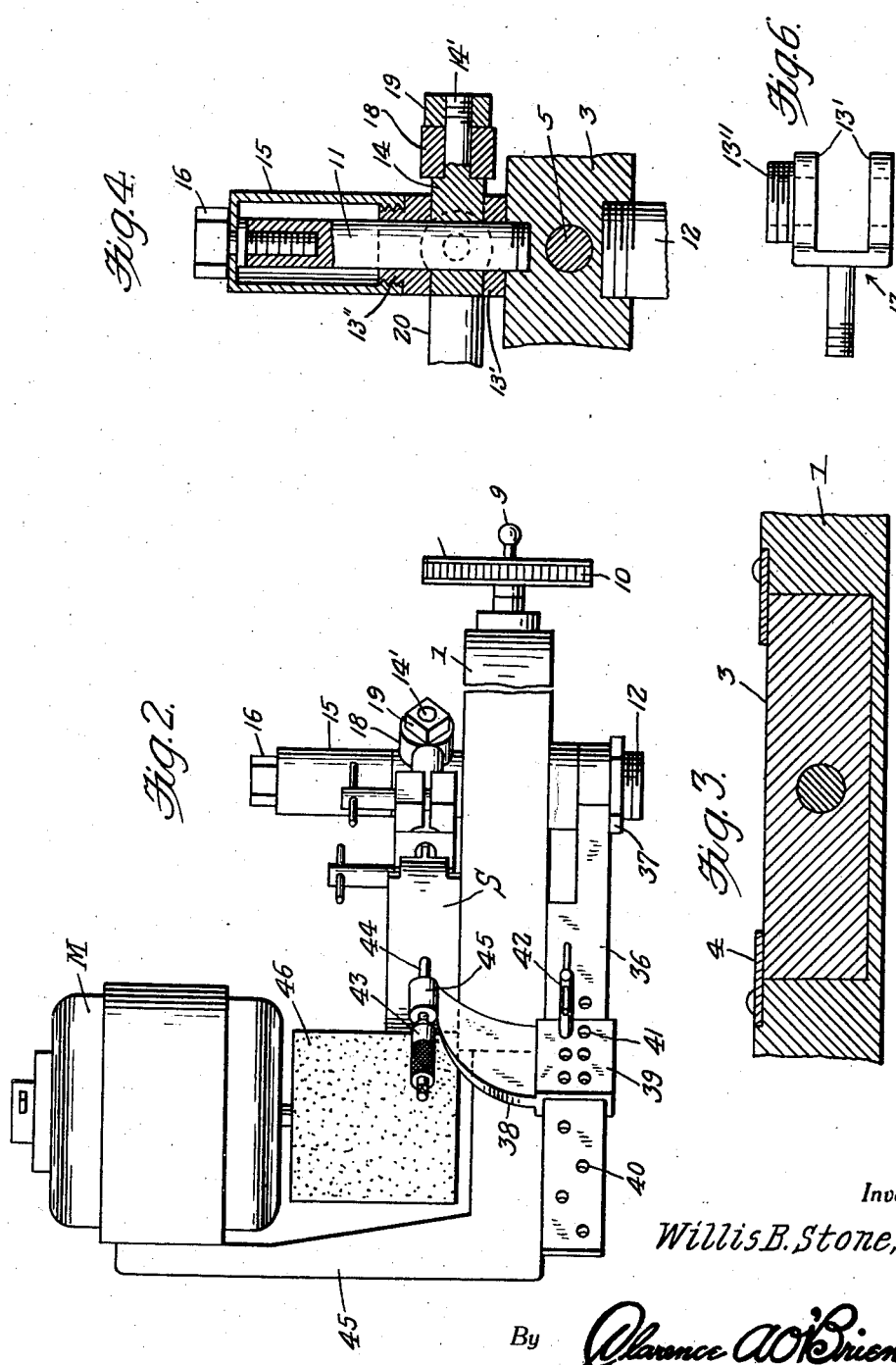
Inventor
Willis B. Stone,
By Clarence A. O'Brien
and Hyman Berman
Attorneys Patented Dec. 24, 1940

2,225,806

UNITED STATES PATENT OFFICE 2,225,806

BRAKE SHOE LINING GRINDING MACHINE

Willis Balard Stone, Oklahoma City, Okla.

Application August 31, 1939, Serial No. 292,952

6 Claims. (Cl. 51—96)

This invention relates to a machine for grinding the brake shoe lining of automobiles and the like, the general object of the invention being to provide a device that will test the arc or radius of any brake shoe and accurately measure the lining of the shoe for testing the trueness of the arc and for grinding the shoe to a predetermined radius.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a top plan view of the invention.

Figure 2 is an elevation thereof.

Figure 3 is a section on the line 3—3 of Figure 1.

Figure 4 is a section on the line 4—4 of Figure 1.

Figure 5 is a side view of the gripping jaw assembly.

Figure 6 is a view of one of the fork bearing members.

In these drawings the numeral 1 designates a table, the top of which is machined and which is adapted to be supported in raised position in any suitable manner, the table being provided with an elongated slot or opening 2 in its top face which forms a track for a block-like carriage 3 which is slidingly held in place by the overlapping elongated plates 4 fastened to the table and overlapping the carriage. A screw shaft 5 passes through a threaded hole in the carriage and also through a plain hole in the front end of the table where the shaft passes through the bearing means 6, the other end of the shaft being located in a bearing socket 7 at the rear end of the opening 2. A wheel 8 is attached to the outer end of the shaft and has a handle 9 thereon whereby the wheel and the shaft can be turned to cause movement of the carriage relative to the table, said wheel having its rim graduated, as at 10. A vertically arranged post 11 has its lower end threaded in a socket formed in the carriage 3 and a depending post 12 has its upper end threaded in a socket in the under face of the carriage, under the post. A bearing member 13 of forked construction (see Figure 6) has its rounded prongs 13' provided with holes through which the post 11 passes and a bearing member 14 has a circular part formed with a hole through which the post 11 passes, this bearing member 14 fitting between the prongs 13' of the member 13 as shown. The upper prong of the member 13 is formed with a threaded boss 13" for receiving the lower threaded end of a cap 15 which fits over the upper portion of the post 11 and is held in place by a bolt 16 threaded into a socket in the upper end of the post. A tubular member 17 has a rounded end 18 which receives the spindle part 14' of the member 14, the part 18 being held on the spindle part by a nut 19 and a similar tubular member 20 has a rounded end 21 which fits over the spindle part of the member 13 and is held thereon by a nut 22. Each of the parts 17 and 20 forms a socket member for a telescopic jaw assembly, the other member of the telescoped arrangement being shown at 23 and each of the members 17 and 20 is formed with a slit 24, as shown in Figure 5 with ears 25 extending from the slitted part and having holes therein for receiving the turn bolts 26 so that the resilient part of each of the members 17 and 20 can be clamped on a member 23 to hold the member 23 in adjusted position. Each of the members 23 is formed with a U-shaped head 27, the upper limb of which is formed with a threaded vertically arranged hole 28 and the other with a threaded vertically arranged hole 29, the two holes being in alignment, with a threaded stud 30 in the hole 29 carrying a ball forming jaw 31 at its upper end and a threaded member 32 passing through the hole 28 and has a handle forming pin 33 passing through its upper end and the lower end of the member 32 carries a ball 34 forming the jaw. Thus by turning the member 32 downwardly by its handle 33 the jaw 34 will coact with the jaw 31 to clamp a web of a brake shoe between the parts. Such a shoe is shown at S with its lining at L with the end portions of the web of the shoe held between the two sets of jaw members. As will be seen each jaw assembly can be adjusted as to length by making the parts telescoping and then the parts can be held in adjusted position by the screw members 26 and the jaw assemblies can also be swung about horizontal axis formed by the spindles of the parts 14 and 13 and then held in adjusted position by tightening the nuts 19 and 22. A pair of bar-like arms 36 is pivoted at one end on the depending post 12 and is held on the post by a nut 37 and each arm supports in a sliding manner a micrometer arm 38 which has a part 39 at its lower end of rectangular shape in cross section through which the bar-like arm 36 passes, the parts being provided with a plurality of holes 40 and 41, any one of which is to receive the screw device 42 for holding the member 38 in adjusted position on the arm 36. The micrometer device is shown generally at 43 with its spindle 44 passing through a tubular part 45 at the upper end of the arm 38, these micrometer instruments being of any suitable type.

An upright 45' is attached to the rear of the table 1 and supports a motor M, the shaft of which depends therefrom and carries a grinding wheel 46 for grinding the lining of the shoe held by the jaw assembly.

As will be seen the jaw assemblies and the measuring instruments have the same common center on the carriage and the parts can be adjusted on the circumference of a circle, the center of which coincides with this common center.

The shoe is firmly held in the two jaw assemblies and by the universal arrangement of the holding devices the arc of the shoe is adjusted to its radius as indicated by the micrometer measuring instruments, both instruments being set for the same radius. In this manner the exact amount of material ground off the lining can be measured by means of either one of the measuring instruments and the grinding operation continued until the desired radius is obtained.

By using balls as the jaws of the holding means the practicability of the device is increased as well as the speed and easiness of handling the shoe in the machine.

For testing the trueness of the arc of a brake shoe and measuring its radius three of the measuring instruments may be used but for grinding the brake shoe lining to a predetermined radius only two of the measuring instruments are used.

A concrete example of the grinding operation is as follows: We will say a brake drum twelve inches in diameter in which a set of brake shoes are to operate has been turned to forty thousandths of an inch (.040") oversize. Now the brake drum will measure 12"+.040" in diameter. Therefore, the radius of the turned drum would measure one-half the diameter or 6"+.020. Now a brake shoe, in most cases, is only a segment of a circle and less than one-half the circle, and, therefore, it is difficult to make an accurate diametrical measurement of the shoe. And inasmuch as all our measurements with this machine are calculated on the radius measurement, hereafter in this explanation of the grinding operation we will refer only to the radius of the brake shoe as well as that of the brake drum.

In the above example we find the radius of the returned drum is .020" larger than its original size and, therefore, if the brake shoe is fitted with a lining thickness designed for the original size of the drum it will not fit the turned drum by a minus measurement of .020". It will now be necessary to use a thicker lining or a shim between the shoe and the original lining in order to make the shoe fit the returned drum. In this case we will use a shim of .025" thickness between the shoe and the original lining. This will make the radius of the brake shoe now measure .005" larger than the radius of the returned drum, and, therefore, the lining will have to be ground off .005" in order to make it fit the drum as originally. The shoe is now ready to be ground to the desired size. Now adjust the two micrometric measuring instruments to the radius of the shimmed shoe, which is 6"+.025", both measuring instruments being adjusted to the same radius measurement. Then place the shoe on the machined surface of table 1 with flat side of shoe down and face of lining towards the grinding wheel 46. Now adjust the shoe until the face of the lining contacts the spindles 44 of the measuring instruments so that one spindle is about one-third the distance from one end of the shoe arc and the other spindle is about the same distance from the other end of the shoe arc. While the shoe is in this position swing the two holding arms 17 and 20 into such a position that telescoping vise can be securely clamped to the web of shoe at any suitable and convenient point. Now through the screws of the upper vise jaws (lower vise jaws having been previously adjusted for web thickness of the shoe) clamp the web firmly, then tighten locking devices 26 and nuts 19 and 22. This will hold the brake shoe in a secure and correct position to be ground. The shoe will now through trunnion bearings 13 and 14 rotate about main pin in the exact radius as indicated on the measuring instruments which in this case is 6"+.025". Now, with grinding wheel rotating at its working speed, through feed screw 5 move the work towards the grinding wheel until the face of the brake shoe lining just touches the grinding wheel. Then note this position as indicated on the graduated free screw handle 8. This will be the position to start grinding. Now swing the work to one side and free of the grinding wheel. Then through carriage feed screw 5 feed the work towards the grinding wheel not to exceed the amount to be ground off the lining as predetermined, which in this case is .005", and indicated on the feed screw graduated handle 8. Now swing the work across the face of the rotating grinding wheel for the grinding cut. After this operation the radius of the brake shoe can be quickly and accurately checked by either of the micrometric measuring instruments by again bringing the spindle of the micrometer in contact with the face of the ground lining. If in the first operation a sufficient amount of the lining has not been removed, the grinding operation may be continued until the correct radius of the shoe is obtained.

Through this process, as can clearly be seen, the position of the brake shoe, when replaced on the vehicle on which it is to be used, and its relation to the other working parts of the brake mechanism will in no wise be changed from the original design. However, a good and satisfactory job will have been accomplished which is the object of this invention.

Having described the invention, what is claimed as new is:

1. A device of the class described comprising a supporting member, a post carried by the supporting member, a pair of members radiating from the post, means for supporting each member for swinging movement on the post with the post forming the axis for said swinging movement, a jaw carrying member extending at right angles from each radiating member and supported for swinging movement thereon with said radiating member forming the axis for such movement, means for adjusting the length of each jaw carrying member and a clamping jaw at the outer end of each jaw carrying member.

2. A device of the class described comprising a supporting member, a post assembly on the supporting member, a pair of members radiating from the post and rotatably mounted thereon, a pair of jaw carrying members extending at right angles from the radiating members, means for adjusting the length of each jaw carrying member, a jaw at the outer end of each jaw carrying member, a pair of arms radiating from the post assembly and rotatably arranged thereon, measuring means for each arm, a support for each measuring means and means for adjusting each support longitudinally on its arm.

3. In a device of the class described, a table, a carriage movable on the table, means for moving the carriage, a post assembly carried by the carriage, elongated members supported from the post assembly for movement about the post assembly as a center, jaw members carried by the elongated members, arms supported by the post assembly for movement about the post assembly as a center, and measuring devices including arms slidably arranged on the first-mentioned arms.

4. In a device of the class described, a table, a carriage movable on the table, means for moving the carriage, a post assembly carried by the carriage, elongated members supported from the post assembly for movement about the post assembly as a center, jaw members carried by the elongated members, arms supported by the post assembly for movement about the post assembly as a center, and measuring devices including arms slidably arranged on the first-mentioned arms, an upright on the table, a motor supported by the upright and having a depending shaft, and a grinding member carried by said shaft.

5. In a device for measuring and grinding lining of brake shoes comprising a carriage, a post assembly thereon, jaw assemblies movable about the post assembly, each jaw assembly including upper and lower jaws each having a spherical member as its gripping part, arms movable about the post assembly, and measuring devices including arms slidably arranged on the first-mentioned arms.

6. A device of the class described comprising a table having an elongated opening therein, a carriage movable in the opening, a screw shaft rotatably arranged in the table and passing through a threaded hole in the carriage for adjusting the same, upper and lower post forming members carried by the carriage, elongated jaw holders movable about the upper post and supported thereby, jaws carried by the holders and including spherical members forming the gripping parts of the jaws, arms rotatably connected at one end with the lower post part and radiating therefrom, upstanding arms having socket members at their lower ends through which the first-mentioned arms pass, means for holding the socket parts in adjusted position on the first-mentioned arms and micrometer measuring instruments at the upper ends of the upstanding arms, an upright on the table, a motor carried thereby and having a depending shaft and a grinding member carried by the shaft for grinding a brake shoe lining held by the jaw assembly.

WILLIS B. STONE.